United States Patent
Grimston

[11] 3,931,978
[45] Jan. 13, 1976

[54] MECHANICAL SEALS

[75] Inventor: Roger Anthony Grimston, Cheshire, England

[73] Assignee: Burmah Engineering Company Limited, Manchester, England

[22] Filed: July 30, 1974

[21] Appl. No.: 492,995

[30] Foreign Application Priority Data
Sept. 26, 1973 United Kingdom............... 45053/73

[52] U.S. Cl................................... 277/93; 277/62
[51] Int. Cl.²........................................ F16J 15/34
[58] Field of Search........... 277/61, 62, 65, 87, 175, 277/86, 87, 93, 39–43

[56] References Cited
UNITED STATES PATENTS

| | | | |
|---|---|---|---|
| 2,820,653 | 1/1958 | Yokel.................................. | 277/62 |
| 3,250,539 | 5/1966 | Kurz et al............................ | 277/41 |
| 3,285,614 | 11/1966 | McClenathan....................... | 277/62 |
| 3,361,431 | 1/1968 | Liss et al............................. | 277/62 |
| 3,782,739 | 1/1974 | Kahanek et al..................... | 277/62 |

*Primary Examiner*—Robert I. Smith
*Attorney, Agent, or Firm*—Sughrue, Rothwell, Mion & Zinn

[57] ABSTRACT

In a mechanical seal, a rotating seal member is secured in position in a spring carrier ring by being engaged by a bayonet joint action behind the crossbars of T-shaped dimples. The rotating seal member is suitably peripherally slotted for this purpose and is urged against the crossbars by a spring loaded pressure plate. When this assembly is incorporated in a mechanical seal with a stationary seal member in running face contact with the rotating seal member the latter and the pressure plate are urged axially inwardly of the cross bars and the springs put under compression.

5 Claims, 13 Drawing Figures

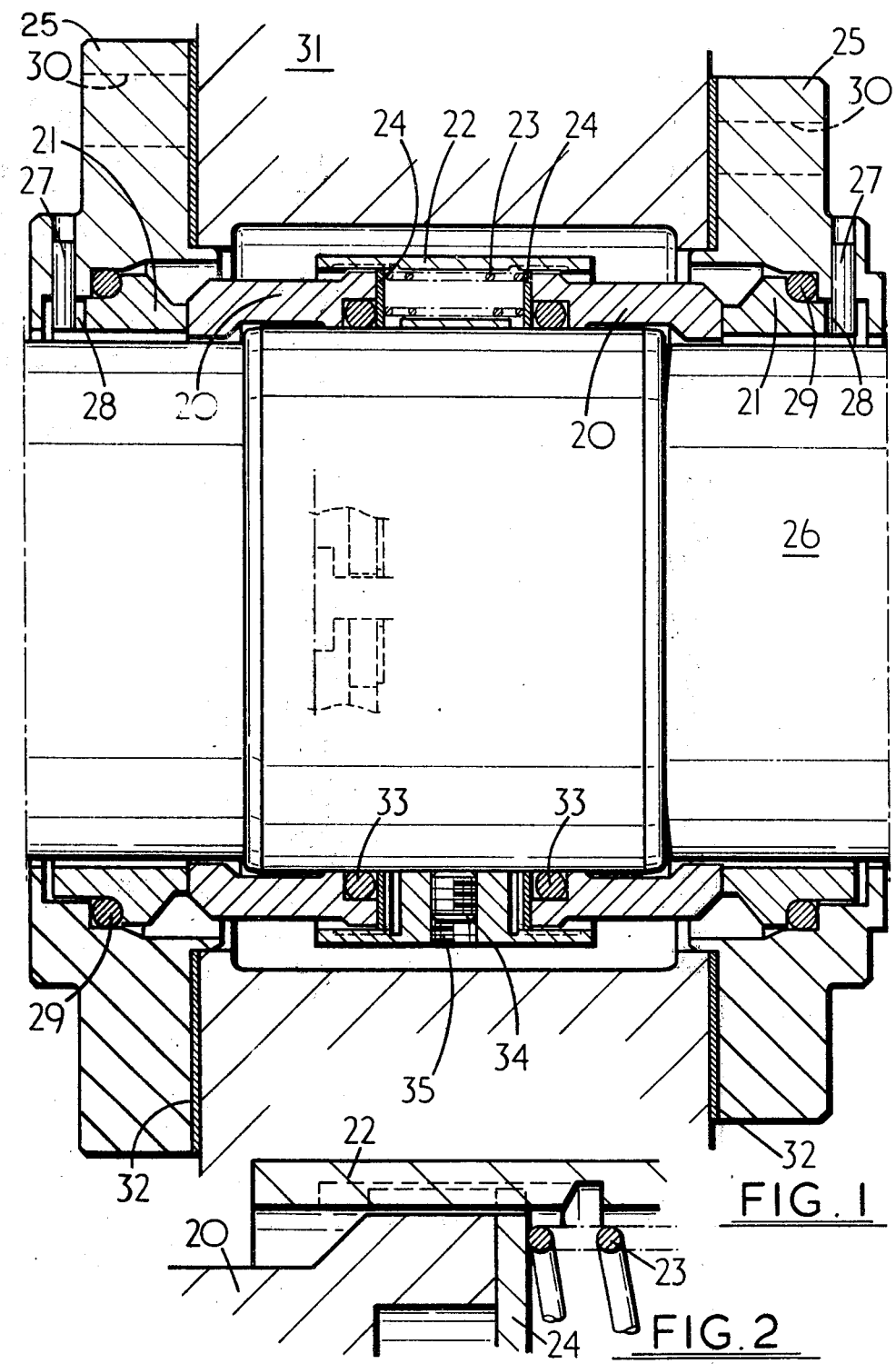
FIG. 1
FIG. 2

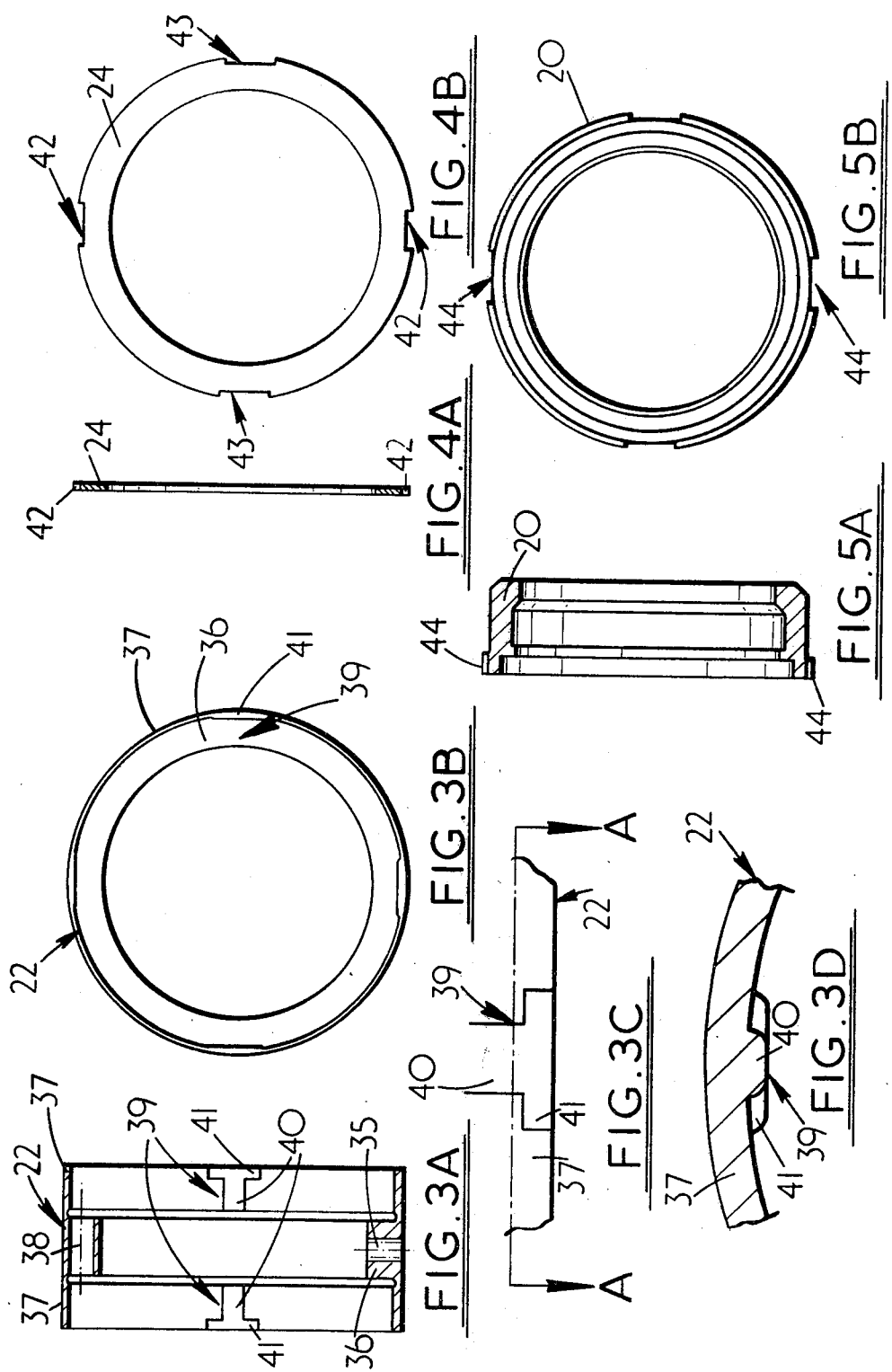

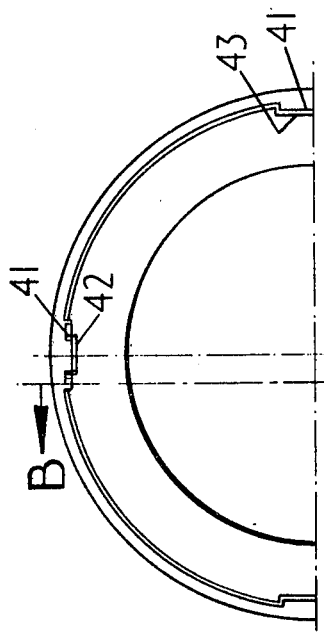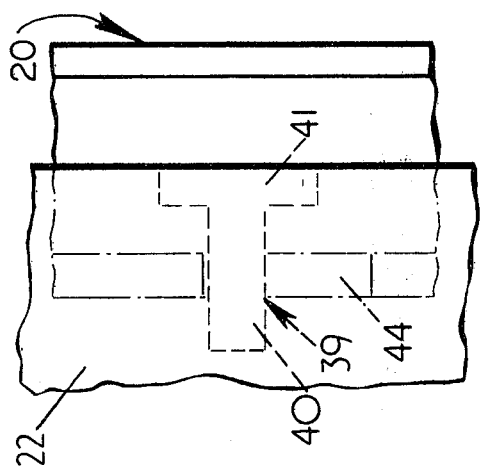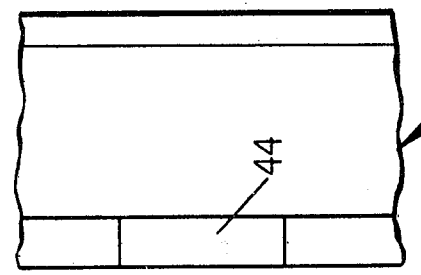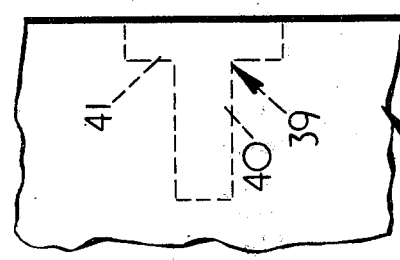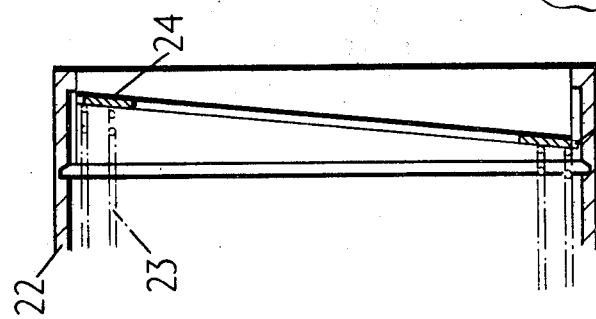

MECHANICAL SEALS

This invention relates to mechanical seals.

It is an object of the present invention to provide a mechanical seal having improved spring retention characteristics.

According to the present invention there is provided a mechanical seal comprising a spring carrier ring having angularly-spaced internal T-shaped dimples behind the crossbars of which a spring pressure plate is engaged, a rotating seal member of the seal is peripherally slotted and is also engaged behind the crossbars by a bayonet-joint action and is held secured in position, prior to installation, by springs mounted in the carrier ring which springs urge the pressure plate against the rotating seal member which, in turn, is urged by the pressure plate against the crossbars.

Preferably, the pressure plate is peripherally slotted (one slot for each T-shaped dimple) with a diametrically opposed pair of the slots having an angular length greater than the length of the T-stem but less than that of the T-crossbar, the other slot having an angular length greater than the length of the T-crossbar.

Preferably also, the peripheral slots in the rotating seal member have an angular length greater than that of the T-crossbar.

The T-dimples may be separate pieces affixed to the carrier ring or are preferably pressed-in and the carrier ring external peripheral surface can be thereafter machined to give a smooth outer surface.

An embodiment of the present invention will now be described, by way of example, with reference to the accompanying drawings, in which:

FIG. 1 is a sectional view of a mechanical seal according to the present invention encompassing a shaft;

FIG. 2 is a detail view of part of FIG. 1 to an enlarged scale;

FIGS. 3A to 3D are respectively a diametral sectional view, an end view, an enlarged detail view of part of FIG. 3A, and a section on the line A—A of FIG. 3C of a ring carrier of the mechanical seal;

FIGS. 4A and 4B are respectively a diametral sectional view and an end view of a pressure plate of the mechanical seal;

FIGS. 5A and 5B are respectively a diametral sectional view and end view of a seal ring of the mechanical seal;

FIGS. 6A and 6B are respectively a diametral sectional view on the line B—B of FIG. 6B and a half end view showing installation of the pressure plate in the ring carrier; and, FIGS. 7A and 7B are respectively views showing initial and final steps of installation of the seal ring in the ring carrier.

The mechanical seal illustrated is of double construction but it is to be clearly understood that the invention is equally applicable to a single construction seal. The seal comprises rotating seal members 20 each abutting in running relationship a stationary seal member 21, the rotating seal members 20 having associated therewith a spring carrier 22, springs 23 and a pair of pressure plates 24.

The pairs of seal members 20, 21 have contiguous or rubbing faces, and each stationary seal member 21 is secured in any convenient manner to a casing 25 traversed by a rotating shaft 26.

The seal members 20, 21 are, of course, annular with the shaft 26 passing axially therethrough.

Each stationary seal member 21, in this instance, is secured to its stationary casing 25 by an anti-rotation pin 27 engaging in a slot or recess 28, in the seal member 21. An O-ring 29 is interposed between each seal member 21 and its casing 25. The two casings 25 are spigotted into and secured, for example, by bolting (see bolt holes 30) to the housing 31 of, say, a pump, whereof the shaft 26 is part, a flat annular sealing element 32 being interposed between each casing 25 and the housing 31.

An O-ring 33 is interposed between each rotating seal member 20 and the shaft 26 which is stepped. The rotary seal ring carrier 22 is secured for rotation with the shaft 26 by a grub screw 34 engaged in a radial bore 35 in the ring carrier 22 and tightened against the shaft 26, or by any other convenient means.

In accordance with the present invention the ring carrier 22, pressure plates 24 and rotating seal members 20 will now be described in greater detail.

The ring carrier 22 (see especially FIGS. 3A to 3D) is of annular construction with a central relatively thick body part 36 and fore-and-aft relatively thin body parts 37. The body part 36 has a series of angularly spaced bores 38 open to the body parts 37 to accommodate the springs 23 and, as aforesaid, one or more radial holes 35 to receive the grub screws 34 for securing the ring carrier 22 to the shaft 26.

If the mechanical seal were of single construction there would, of course, only be one body part 37 and the bores 38 would be blind.

The body parts 37 each have, for example, four internal equi-angular spaced T-dimples 39 formed by either of the two methods aforesaid or by any other convenient method, and with the stems 40 directed towards the body part 36 and the crossbars 41 at the free circumferences of the body parts 37.

Each pressure plate 24 (see especially FIGS. 4A and 4B) has four equi-angularly spaced slots machined in its circumference, a diametrically opposed pair of slots 42 each have an angular length greater than the angular length of the T-stem 40 but less than that of the T-crossbar 41 while the other pair 43 each have an angular length greater than that of the T-crossbar 41.

The rotating seal member 20 (see especially FIGS. 5A and 5B) also has four equi-angularly spaced slots 44 machined in its circumference with each slot having an angular length greater than that of the T-crossbar.

Each pressure plate 24 is fitted to the ring carrier 22 (see especially FIGS. 6A and 6B) with its springs 23 in position by tilting each pressure plate 24 at an angle and hooking one of the narrower slots 42 behind the crossbar 41 of one of the T-dimples 39. By pushing the side of the pressure plate 24 down (or inwards) against the springs 23 it is then possible to hook the other narrower slot 42 behind the crossbar of its T-dimple 39, the other two slots 43 simply passing over their T-crossbars 41. The springs 23 urge each pressure plate 24 against the T-dimples 39. This arrangement prevents rotation of the pressure plates 24 to bend the springs 23 and the pressure plates 24 cannot fall out since the narrower slots 42 are locked behind the T-crossbars 41.

Each rotating seal member 20 (see especially FIGS. 7A and 7B) is now presented with its slots 44 aligned with the T-crossbars 41 and is pushed into the ring carrier to move its corresponding pressure plate 24 away from the T-crossbars 41. A slight angular movement of each rotating seal member 20 in the manner of a bayonet-joint connection locates it behind the T-crossbars 41 and, on release, it is locked in this position by being clamped between the T-crossbars 41 and its corresponding spring loaded pressure plate 24.

There is thus provided a ring carrier/pressure plate/rotating seal member assembly ready for installation in a mechanical seal for location and securement on a rotating shaft.

It can clearly be seen from FIGS. 1 and 2 of the drawings that when the mechanical seal is secured on the shaft 26, the rotating seal members 20 and pressure plates 24 are spaced axially inwards of the crossbars 41 and the springs 23 are under compression.

What is claimed is:

1. A mechanical seal comprising:
   a. at least one stationary seal member;
   b. a rotatable spring carrier ring having a plurality of angularly spaced, T-shaped dimples about its inner surface adjacent at least one edge;
   c. at least one rotatable annular seal member having a plurality of angularly spaced, peripheral flange segments defining slots therebetween, said slots dimensioned so as to pass over said T-shaped dimples of said spring carrier ring while angular displacement of the rotatable seal member with respect to the spring carrier ring causes the flange segments to engage the T-shaped dimples thereby attaching said at least one rotatable seal member to said spring carrier ring;
   d. at least one pressure plate disposed within said spring carrier ring and bearing against the rotatable seal member; and
   e. at least one spring means disposed within said spring carrier ring and bearing against the at least one pressure plate so as to urge the rotatable seal member against the stationary seal member.

2. A mechanical seal as claimed in claim 1, in which the at least one pressure plate has a periphery with a plurality of slots therethrough, (one slot for each T-shaped dimple) with a diametrically opposed pair of slots having an angular length greater than the length of the T-stem but less than that of the T-crossbar, the other slot having an angular length greater than the length of the T-crossbar.

3. A mechanical seal as claimed in claim 1, in which the peripheral slots in the at least one rotatable seal member have an angular length greater than that of the T-crossbar.

4. A mechanical seal as claimed in claim 1 in which the T-dimples are separate pieces affixed to the spring carrier ring.

5. A mechanical seal as claimed in claim 1, in which the T-dimples are pressed in.

* * * * *